(12) United States Patent
Plaksunov et al.

(10) Patent No.: US 7,955,547 B2
(45) Date of Patent: Jun. 7, 2011

(54) METHOD AND DEVICE FOR FORMING ARTICLES FROM FOAMING POLYMERS BY USING MICROWAVE RADIATION

(75) Inventors: Andrey Nikolaevich Plaksunov, Moscow (RU); Igor Nikolaevich Golubev, Podolsk (RU)

(73) Assignee: ZAO "Elefom', Moscow (RU)

( * ) Notice: Subject to any disclaimer, the term of this patent is extended or adjusted under 35 U.S.C. 154(b) by 0 days.

(21) Appl. No.: 12/297,598

(22) PCT Filed: Nov. 16, 2006

(86) PCT No.: PCT/RU2006/000612
§ 371 (c)(1),
(2), (4) Date: Feb. 12, 2009

(87) PCT Pub. No.: WO2007/067095
PCT Pub. Date: Jun. 14, 2007

(65) Prior Publication Data
US 2009/0243158 A1 Oct. 1, 2009

(30) Foreign Application Priority Data
Dec. 6, 2005 (RU) .................................. 2005137810

(51) Int. Cl.
*H05B 6/64* (2006.01)
(52) U.S. Cl. .. 264/417; 264/402; 264/432; 264/DIG. 11
(58) Field of Classification Search .................. 264/417, 264/402, DIG. 11, 432
See application file for complete search history.

(56) References Cited

U.S. PATENT DOCUMENTS

| 4,298,324 | A | * | 11/1981 | Soulier .................. 425/174.8 E |
| 4,420,448 | A | * | 12/1983 | Krutchen .......................... 264/53 |
| 4,426,065 | A | * | 1/1984 | Komatsuzaki et al. ...... 264/45.9 |
| 5,128,073 | A | * | 7/1992 | Allen et al. .................... 264/417 |
| 5,342,560 | A | * | 8/1994 | Sturm et al. ................. 264/45.9 |
| 5,976,454 | A | * | 11/1999 | Sterzel et al. ..................... 419/2 |
| 6,228,478 | B1 |  | 5/2001 | Kliwer et al. |
| 6,538,042 | B1 | * | 3/2003 | Berghmans et al. ............ 521/58 |
| 2005/0123435 | A1 | * | 6/2005 | Cutler et al. ...................... 422/1 |

FOREIGN PATENT DOCUMENTS

| DE | 19648093 | 5/1998 |
| DE | 102004049060 | 6/2005 |
| EP | 1508420 | 2/2005 |
| WO | 90/86420 | 8/1990 |

* cited by examiner

*Primary Examiner* — Joseph S Del Sole
*Assistant Examiner* — David N Brown, II
(74) *Attorney, Agent, or Firm* — patenttm.us

(57) ABSTRACT

The inventive method for forming articles from foaming polymers and compositions based thereon consists in forming articles using a heat energy released by water exposed to the action of microwave radiation al n temperature equal to or less than 170° C., wherein said temperature is attained, controlled and limited by adjusting a vapor pressure in a forming chamber. The inventive device for carrying out said method comprises a forming chamber, which is made of a microwave transparent material, filled with the mixture of prefoamed or granulated foaming polymer or a composition based thereon with water and is placed in a microwave radiation producing channel, and a unit for equalizing a pressure in said forming chamber. The forming chamber and the body thereof made of a microwave non-transparent material are provided with air holes, which are also used for connecting the forming chamber to the pressure equalizing unit.

1 Claim, 2 Drawing Sheets

METHOD AND DEVICE FOR FORMING ARTICLES FROM FOAMING POLYMERS BY USING MICROWAVE RADIATION

FIELD OF THE INVENTION

The present invention relates to producing articles from granulated foaming polymers and from compositions based thereon, in particular to a device for forming articles at a limited temperature of thermal energy produced by water exposed to microwave radiation later used for drying finished articles [B29C44/02, H05B6/64].

PRIOR ART

Articles made of foaming polymers are widely used in the industrial and household applications. The most used foaming polymer is foam polystyrene; apart from it, foam polyethylene, foam polypropylene and other foam polymers are used. Foam polystyrene articles are mostly known as foam plastic, which has a density ranging from 10 to 35 kg/m$^3$ and is used for producing transportation containers for household appliances and other soft packages. Further, foam plastic is widely used in the production of construction and heat-insulation materials as well as in other industries. Also, of ever growing use are articles made of styropore (rigid foam) which is foam polystyrene having a density ranging from 35 to 90 kg/m$^3$ used for producing a variety of containers and shock-proof packages. Foam polyethylene and foam polypropylene are mostly used as flexible heat-insulation materials and sealants.

Foaming polymers and compositions based thereon are, as a rule, formed by exposing them to thermal energy, in a limited range of temperatures which depend on specific plastication of polymers as well as on activation temperatures of foaming additives.

Devices for forming articles from foaming polymers are designed so as to provide for foaming a polymer or a composition based thereon due to various exposures temporarily raising its temperature. During such a process a foaming polymer occupies all the volume provided, after which an article is cooled down, and the polymer becomes solid. In order to stabilize the foaming process a granulated material may be pre-foamed, and then a required bulk density may be achieved.

A device is known for producing cellular articles from foam plastics, which comprises a reaction chamber provided with a pressure-release valve, molds with perforated walls, which are arranged in the reaction chamber, a control module for article forming process, and a steam delivery system connected to the reaction chamber and the control module for article forming process. The steam delivery system is a steam generator arranged in a reaction chamber and comprising a thermal element and an assembly with a feeder for delivering water to the thermal element. The feeder output is arranged above the thermal element. A production method comprises pre-foaming of a granulated material, its aging and drying, feed of the pre-foamed granulated material to a mold with perforated walls, and placement of the mold with the material in a reaction chamber, delivery of pressurized steam and isobaric equalization until obtaining a cake mass of the material, and an abrupt release of steam pressure to the barometric pressure and subsequent cooling of a finished article. Steam is delivered as a pulse by abrupt pressure rise to 1.5 bars and release to 1.17 bars, which is necessary for isobaric equalization of the material. The steam pulse duration, when delivering steam to a chamber, is not more than 0.2 second (see RF Patent #94030599, B29C 44/02, 1996).

A disadvantage of the known device is complexity of obtaining uniform densities and regular surfaces of articles, including those made of styropore, since a formed article is steam-heated directly through its surface, i.e., through pores present between pre-foamed granules, which are rapidly occluded during foaming. In the result, a temperature gradient occurs, and heating of granules in the interior of an article, where foaming is insufficient, becomes problematic due to low thermal conduction of granules. And if pressure in increased in a reaction chamber, the article surface is overheated, which entails deformations, unpredictable shrinkages and higher surface fragility of articles. Moreover, this production process requires that pre-foamed granules are aged and dried before forming, as well as a relatively great time period for cooling a formed article directly in the mold, frequently with drying it by vacuum. All this results in lowering productivity and increasing a production equipment base as well as in significant limitations in a production line of articles, including those of irregular thickness and complex forms.

The objective of this invention is to improve performance and increase a production line of articles, while simultaneously simplifying production processes and reducing production equipment base. Wherein the inventive device and articles produced therewith have improved consumer properties.

The above technical effect is achieved due to the fact that forming of articles from foaming polymers and compositions based thereon proceeds in a device comprising a formation chamber made of a microwave transparent material, to which a mixture of a pre-foamed or granulated polymer or a composition based thereon is fed, and water placed in a microwave radiation producing channel, as well as a unit for increasing and equalizing pressure in the formation chamber, wherein articles are formed by thermal energy produced by water exposed to microwave radiation at a temperature up to 170 degrees Centigrade, which is achieved, adjusted and limited by controlling steam pressure in the formation chamber.

The formation chamber and its body made of a microwave non-transparent material are provided with air holes that are also used for connecting the formation chamber with the unit for increasing and equalizing pressure. The diameter of said air holes is minimized so as microwave radiation may not pass through them to the outside of the formation chamber.

The unit for increasing and equalizing pressure comprises am air compressor, an air receiver connected to the air holes in the body of the formation chamber, and a regulating valve and an emergency valve. The compressor is used for increasing pressure in the air receiver during foaming. The regulating valve maintains pressure in the air receiver and the formation chamber at a predetermined level or in a numeric level field, setting a rate of air and steam exit from the air receiver. The emergency valve is used for rapidly releasing excess pressure, which exceeds the operating pressure, at a failure of the regulating valve or in other emergency situations.

A finished article after foaming is dried directly in the formation chamber by microwave radiation, at the same time its temperature is lowered by a cooling circuit arranged in the body of the formation chamber.

Preformed beads are fed to the formation chamber for foaming without a time period of drying and aging. Water is fed to the formation chamber by doses of air-droplet mixture or steam.

Beads fed to the formation chamber are metered prior to pre-foaming by volume or by a corresponding mass of initial granules of a foaming polymer.

DESCRIPTION OF THE INVENTION

Figure 1:
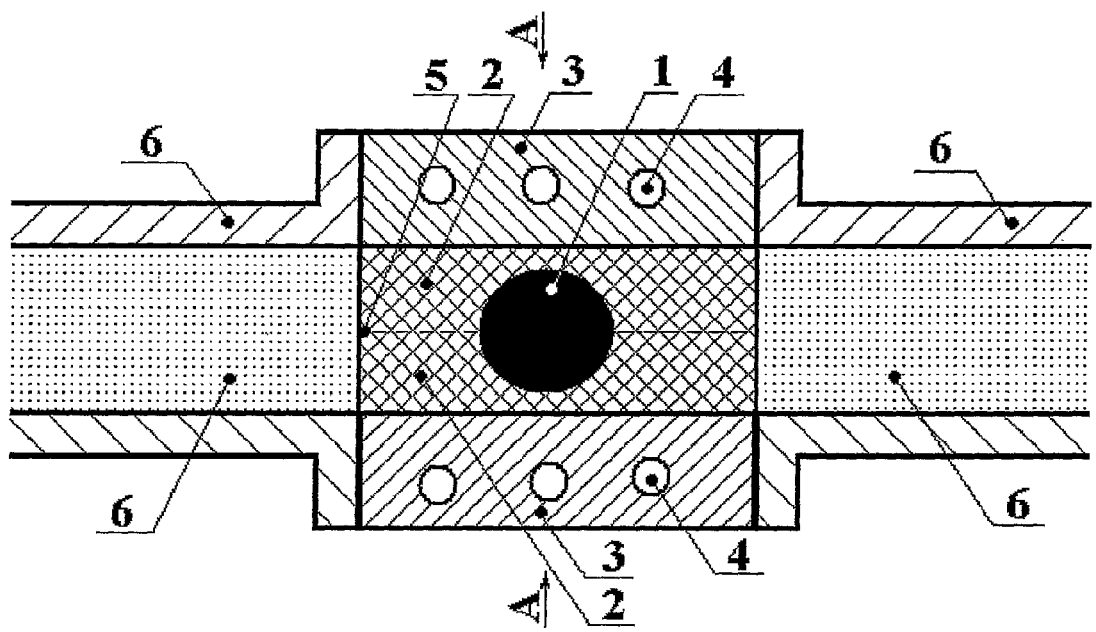
FIG. 1 shows a fragment of the formation chamber with the microwave radiation producing channel, a lateral cross-section view along a formed article.

With reference to FIG. 1, an article 1 to be formed by foaming a polymer in the correspondingly filled limited volume of the formation chamber 2, which comprises two mating parts and is placed in the microwave radiation providing channel 6. The article to be formed is shown as a ball, just for the purpose of illustration.

The limited volume of the formation chamber mating parts is filled with a mixture of a pre-foamed or granulated foaming polymer or a composition based thereon before each production cycle, and with water fed through a supplying channel that may be cut off (not shown).

The formation chamber 2, which is made of a microwave transparent material, is arranged in the formation chamber body 3 made of a microwave non-transparent material, wherein the body has a cooling circuit 4. The mating filled parts of the formation chamber 2 are separated from the mating parts of the formation chamber body 3 along the separating line 5. The microwave radiation providing channel 6 has microwave non-transparent walls due to which a combined waveguide is formed from the walls of the microwave radiation providing channel 6 and the inner part of the formation chamber body 3. This enables to build this assembly into a microwave resonator or into another system for directed provision of microwave radiation.

The cooling circuit 4 is intended for continuous cooling of the formation chamber body 3 and the very formation chamber 2, as a rule with the use of cold water. It is necessary for accelerating the cooling process and polymerizing a formed article as well as for minimizing the effects of non-uniform expansion of a material in the formation chamber during discontinuous heating by steam formed by interaction between microwave radiation and water.

Figure 2:
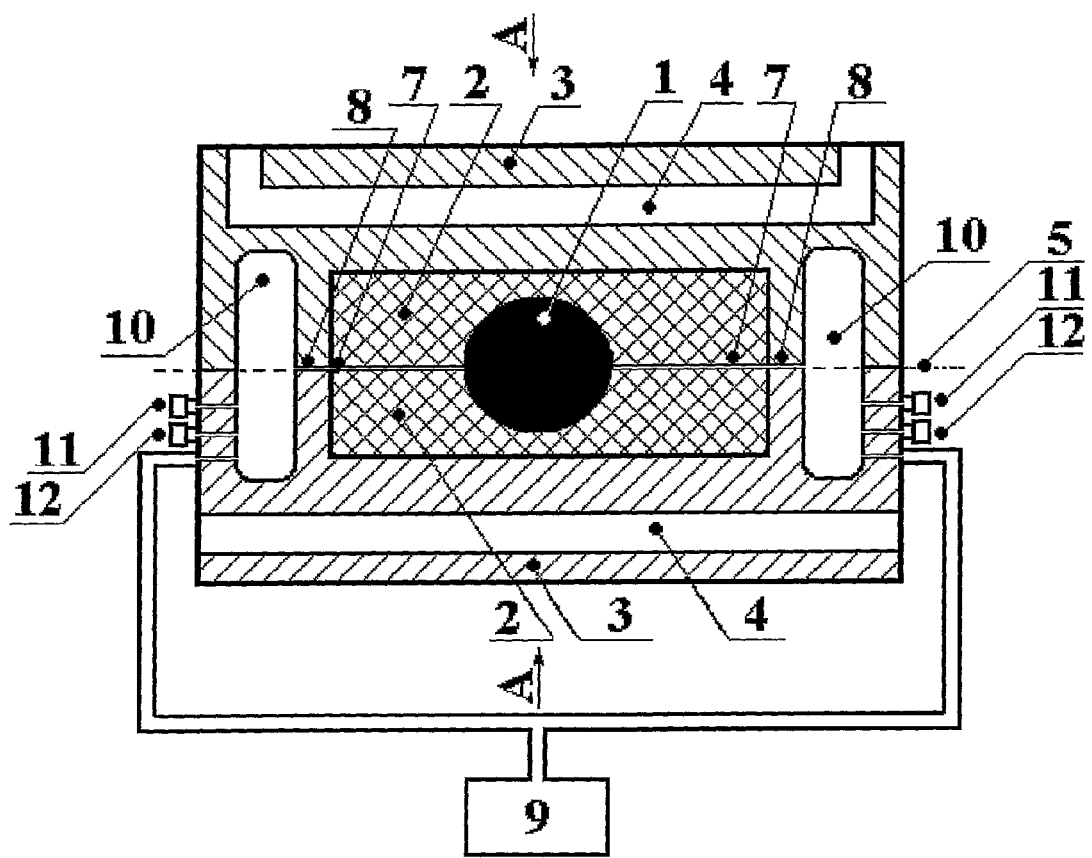
FIG. 2 shows a fragment of the formation chamber, also showing the unit for increasing and equalizing pressure, an orthogonal cross-section view along a formed article.

FIG. 2 shows the unit for increasing and equalizing pressure in the formation chamber 2 which is connected to an air receiver 10 through air holes in the formation chamber 7 and air holes in the formation chamber body 8, which are made in the form of indents, grooves or scores on the mating opened parts of the formation chamber 2 as well as on the formation chamber body 3, which are located along the separating line between the formation chamber and its body 5. The diameter of those air holes is minimized so as not to allow microwave radiation pass through them to the outside of the formation chamber.

The unit for increasing and equalizing pressure in the formation chamber 2 comprises the air compressor 9, the air receiver 10 connected to the air holes in the formation chamber body 7, as well as a regulating valve 11 and an emergency valve 12.

The air receiver 10 is the inner cavity of the mating parts of the formation chamber body 3 and is designed for leveling surges in air or steam pressure as well as for pneumatic communication between all the components of the unit for increasing and equalizing pressure in the formation chamber, wherein it communicates to the atmosphere through the air compressor 9, the regulating valve 11 and the emergency valve 12. In order to uniformly distribute pressures in the formation chamber, the air receiver 10 may be made as several cavities distributed along the edges of a formed article 1 in such a case the number of regulating valves 11, emergency valves 12 and fittings providing air from the air compressor 9. FIG. 2 illustratively shows two chambers of the air receiver 10.

The air compressor 9 increases pressure in the air receiver 10 during foaming. The regulating valve 11 maintains pressure in the air receiver 10 and the formation chamber 2 at a predetermined level or in a numerical field of levels, thus setting an air or steam output rate for the air receiver 10. The emergency valve 12 is used for rapid release of excess pressure, when it exceeds the operating pressure, in a case of a failure of the regulating valve 11 or in other emergency conditions.

A foaming polymer in the form of granules or pre-foamed beads is fed to the foaming chamber 2 with metered supply of water or steam, after which a predetermined air pressure is set in the air receiver 10 and the formation chamber 2 with the air compressor 9 and the regulating valve 11, which enables to raise the water boiling point and the corresponding temperature of saturated water steam.

During treating the formation chamber 2 with microwave radiation water in it boils and raises temperature to a predetermined value. The regulating valve 11 enables to control such temperature in a stable operation mode.

An initial granulated material may be used in the production process without pre-foaming, provided a density of finished articles is more than 200 kg/m$^3$. In order to obtain a lesser density single-time or repeated pre-foaming of a granulated material is required.

Pressure in the formation chamber, as set by the regulating valve 11, may be determined by a table of correlation between pressures of saturated water steam and temperatures suitable for forming articles from a specific foaming polymer. A temperature above 170° C. may be achieved at a pressure of saturated water steam in excess of 8 bars, and taking into account that steam in the formation chamber will be saturated only within a very short period of time and that practically every foaming polymer has a lesser formation temperature, 170° C. is the maximum allowable temperature in this production process. If this temperature as well as corresponding pressure values of saturated water steam are exceeded, then the foaming process may become unstable and dangerously explosive, since set parameters are to be achieved in the critical mode of instantaneous microwave heating where a rate of discharging water and steam from the foaming chamber 2 will be significantly lower than a rate of bead volume increase during foaming.

A finished formed article 1 is dried after foaming directly in the formation chamber 2 with the use of the very microwave radiation, simultaneously with lowering temperature of the article 1 by the cooling circuit 4 arranged in the formation chamber body 3.

A finished formed article 1 is removed from the formation chamber 2 after polymerization is complete by separating the mating filled parts of the formation chamber 2 and the formation chamber body 3 along the separating line 5 with the use of a mechanical or pneumatic push bar (not shown).

Before forming pre-foamed beads may have a bulk density that is significantly higher than a density of a formed article 1, and no additional drying and aging of beads is required, since it is heated in the foaming chamber 2 by steam continuously exiting from the foaming chamber due to which excess moisture is removed and the formed article 2 is dried.

For the foaming process additional metered supply of water to the formation chamber 2 is required in the form of air-droplet mixture or steam, depending on a density of a formed article 1, including supply of cold steam at a temperature below 100° C. This enables to significantly accelerate the process of forming articles from foam plastics, since the time necessary for converting water to steam as well as the time necessary for preliminary heating of beads during the foaming process is saved. The optimal supply of water or steam to the foaming chamber will be by the use of quick-response chemical-resistant valves controlled by a time relay in the whole cycle of the production process.

Since before forming pre-foamed beads may have a bulk density, which is significantly higher than a density of a formed article 1, the foaming chamber will be filled with beads incompletely, which requires metering beads having variable densities in different production cycles, which significantly complicates this process. For the purposes of simplifying the inventive device and this production process beads are metered to the foaming chamber by volume or by corresponding masses of an initial granulated foaming polymer, since a density of a granulated polymer is rather stable, and such a method of metering enables to ensure that no excess feedstock will be expended, or, to the contrary, to avoid insufficient structural rigidity at not more than 3% deviation from a predetermined density of formed articles.

The optimal metering of a granulated material fed for pre-foaming will be achieved with a regularly filled automatic volumetric feeder which is pneumatically connected to subsequent components of the production process.

What is claimed is:

1. A method for forming articles from foaming polymers and compositions based thereon, utilizing a formation chamber from a microwave transparent material, to which formation chamber a mixture of a pre-foamed or granulated foaming polymer or a composition based thereon and water is fed, and which formation chamber is arranged in a microwave radiation providing channel, and a unit for increasing and equalizing pressure in the formation chamber, the articles being formed by thermal energy produced by water exposed to microwave radiation at a temperature up to 170 degrees Centigrade which is achieved, regulated and limited by regulating steam pressure in the formation chamber by means of the unit for increasing and equalizing pressure, characterized in that said unit for increasing and equalizing pressure comprises an air compressor, an air receiver connected to said air holes of the formation chamber, and a regulating valve and an emergency valve, wherein said compressor increases pressure in said air receiver during foaming, and said regulating valve maintains pressure in said air receiver and said formation chamber at a predetermined level or in a predetermined numerical field of levels, thus setting an air or steam rate of output from said air receiver.

* * * * *